US010771476B2

(12) United States Patent
Thubert et al.

(10) Patent No.: US 10,771,476 B2
(45) Date of Patent: Sep. 8, 2020

(54) DEFEATING MAN-IN-THE-MIDDLE ATTACKS IN ONE LEG OF 1+1 REDUNDANT NETWORK PATHS

(71) Applicant: Cisco Technology, Inc., San Jose, CA (US)

(72) Inventors: Pascal Thubert, La Colle sur Loup (FR); Patrick Wetterwald, Mouans Sartoux (FR); Eric Levy-Abegnoli, Valbonne (FR); Jean-Philippe Vasseur, Saint Martin d'uriage (FR)

(73) Assignee: Cisco Technology, Inc., San Jose, CA (US)

( * ) Notice: Subject to any disclaimer, the term of this patent is extended or adjusted under 35 U.S.C. 154(b) by 157 days.

(21) Appl. No.: 15/920,651

(22) Filed: Mar. 14, 2018

(65) Prior Publication Data
US 2019/0289022 A1    Sep. 19, 2019

(51) Int. Cl.
*H04L 29/06* (2006.01)
*H04L 12/823* (2013.01)
(Continued)

(52) U.S. Cl.
CPC ........ *H04L 63/1408* (2013.01); *H04L 9/3239* (2013.01); *H04L 9/3242* (2013.01); *H04L 47/32* (2013.01); *H04L 63/1458* (2013.01); *H04L 63/1466* (2013.01); *H04W 12/1204* (2019.01); *H04L 12/28* (2013.01);
(Continued)

(58) Field of Classification Search
CPC ............ H04L 63/1408; H04L 63/1466; H04L 63/1458; H04L 63/1425; H04L 2463/143; H04L 2463/142; H04L 9/3239; H04L 9/3242; H04L 2209/80; H04L 12/28; H04L 47/32; H04W 12/1204
See application file for complete search history.

(56) References Cited

U.S. PATENT DOCUMENTS 7,882,349 B2    2/2011  Cam-Winget et al.
9,705,700 B2    7/2017  Ficara et al.
(Continued)

OTHER PUBLICATIONS

Ditzel, et al., "Time Sensitive Network (TSN) Protocols and use in EtherNet/IP Systems", Technical Track—2015 Industry Conference & 17th Annual Meeting, 25 pages, ODVA, Inc.
(Continued)

*Primary Examiner* — Joseph P Hirl
*Assistant Examiner* — Thomas A Gyorfi
(74) *Attorney, Agent, or Firm* — Behmke Innovation Group LLC; Kenneth J. Heywood; James J. Wong

(57) ABSTRACT

In one embodiment, an elimination point device in a network obtains a master secret from a network controller. The elimination point device assesses, using the master secret, whether an incoming packet received by the elimination point device from a redundant path between the elimination point device and a replication point device in the network includes a valid message integrity check (MIC). The elimination point device determines whether the incoming packet was injected maliciously into the redundant path, based on the assessment of the incoming packet. The elimination point device initiates performance of a mitigation action in the network, when the elimination point device determines that the incoming packet was injected maliciously into the redundant path.

20 Claims, 12 Drawing Sheets

(51) Int. Cl.
　　　H04W 12/12　　　(2009.01)
　　　H04L 9/32　　　　(2006.01)
　　　H04L 12/28　　　(2006.01)
(52) U.S. Cl.
　　　CPC ...... *H04L 63/1425* (2013.01); *H04L 2209/80* (2013.01); *H04L 2463/142* (2013.01); *H04L 2463/143* (2013.01)

(56) References Cited

U.S. PATENT DOCUMENTS

| | | | | |
|---|---|---|---|---|
| 2008/0250500 | A1* | 10/2008 | Olson | G06F 21/552 726/23 |
| 2011/0129090 | A1* | 6/2011 | Grall | H04L 9/0841 380/285 |
| 2014/0105033 | A1 | 4/2014 | Vasseur | |
| 2019/0190777 | A1* | 6/2019 | Uchizumi | H04L 45/74 |

OTHER PUBLICATIONS

Finn, et al., "[HSR-PRP]", Deterministic Networking Architecture—Internet-Draft, <draft-ietf-detnet-architecture-04>, https://tools.ietf.org/html/draft-ietf-detnet-architecture-04#ref-HSR-PRP, 1 page, Oct. 2017, IETF Trust.
Haleplidis, et al.,"Software-Defined Networking (SDN): Layers and Architecture Terminology", Internet Research Task Force (IRTF), Request for Comments: 7426, Jan. 2015, 35 pages, IETF Trust.
He, Changhua., "Analysis of Security Protocols for Wireless Networks", http://theory.stanford.edu/~changhua/thesis_full.pdf, Dec. 2005, 157 pages, Changhua He.
Huang, et al., "Observations on the Message Integrity Code in IEEE 802.11 Wireless LANs", https://www.uow.edu.au/~jennie/WEBPDF/2004_13.pdf, 5 pages, Accessed on Dec. 7, 2017, University of Wollongong.
Kirrmann, Hubert., "Highly Available Automation Networks Standard Redundancy Methods", Rationales behind the IEC 62439 standard suite, http://lamspeople.epfl.ch/kirrmann/Pubs/IEC_62439-1/IEC_62439_Summary.pdf,2012, 51 pages, ABB Switzerland Ltd.
Korhonen, et al., "DetNet Data Plane Encapsulation", <draft-dt-detnet-dp-sol-02>, DetNet-Internet-Draft, 36 pages, Sep. 2017, IETF Trust.
Mizrahi, et al., "Deterministic Networking (DetNet) Security Considerations", <draft-ietf-detnet-security-01>, Internet Engineering Task Force—Internet-Draft, 31 pages, 2017, IETF Trust.
Mizrahi, et al., "Deterministic Networking (DetNet) Security Considerations", <draft-sdt-detnet-security-01>, Internet Engineering Task Force, Internet-Draft, 35 pages, Jul. 2, 2017, IETF Trust.
Mizrahi, et al., "5.2. Integrity Protection", Deterministic Networking (DetNet) Security Considerations, <draft-ietf-detnet-security-00>, Internet Engineering Task Force—Internet-Draft, 1 page, Sep. 2017, IETF Trust.
Oki, et al., "Extensions to the Path Computation Element Communication Protocol (PCEP) for Route Exclusions", Network Working Group, Request for Comments: 5521, Apr. 2009, 16 pages, IETF Trust.
Reddy, Bharadwaj S.,"Wireless HART Communication Protocol Overview", http://instrumentationtools.com/wireless-hart-communication-protocol-overview/#.WhvXUFWWblW, 9 pages, Accessed on Nov. 27, 2017, instrumentationtools.com.
Zuponcic, et al., "TSN Influences on ODVA Technologies: IEEE-802.1, Avnu, IETF", 2017 Industry Conference & 18th Annual Meeting, Feb. 2017, 13 pages, ODVA, Inc.
"802.1CB—Frame Replication and Elimination for Reliability", http://www.ieee802.org/1/pages/802.1cb.html, 2 pages, Accessed on Dec. 12, 2017, Institute of Electrical and Electronics Engineers, Inc.
"Avnu Alliance", http://avnu.org/, 3 pages, Accessed Dec. 7, 2017, AVNU.
"Communication protocol", https://en.wikipedia.org/wiki/Communication_protocol, 19 pages, Dec. 7, 2017, Wikimedia Foundation, Inc.
"Deterministic Networking (detnet)", https://datatracker.ietf.org/wg/detnet/about/, 3 pages, Accessed Dec. 7, 2017, 3 pages, IETF Datatracker.
"Electrical substation", https://en.wikipedia.org/wiki/Electrical_substation, 8 pages, Nov. 22, 2017, Wikimedia Foundation, Inc.
"Ethernet", https://en.wikipedia.org/wiki/Ethernet, 13 pages, Nov. 29, 2017, Wikimedia Foundation, Inc.
"Failover", https://en.wikipedia.org/wiki/Failover, 2 pages, Nov. 13, 2017, Wikimedia Foundation, Inc.
"High availability", https://en.wikipedia.org/wiki/High_availability, 8 pages, Nov. 4, 2017, Wikimedia Foundation, Inc.
"High-availability Seamless Redundancy", https://en.wikipedia.org/wiki/High-availability_Seamless_Redundancy, 5 pages, Nov. 3, 2017, Wikimedia Foundation, Inc.
"IEC 61850", https://en.wikipedia.org/wiki/IEC_61850, 4 pages, Dec. 5, 2017, Wikimedia Foundation, Inc.
"IEEE 802.1 Time-Sensitive Networking Task Group", http://www.ieee802.org/1/pages/tsn.html, 2 pages, Accessed on Dec. 7, 2017, Institute of Electrical and Electronics Engineers, Inc.
"Industrial Ethernet", https://en.wikipedia.org/wiki/Industrial_Ethernet, 3 pages, Aug. 14 2017, Wikimedia Foundation, Inc.
"Industrial Internet Consortium", http://www.iiconsortium.org, 3 pages, Accessed Dec. 7, 2017, Object Management Group, Inc.
"International Electrotechnical Commission", https://en.wikipedia.org/wiki/International_Electrotechnical_Commission, 7 pages, Dec. 5, 2017, Wikimedia Foundation, Inc.
"OZD Genius G12 and OZD Modbus Plus G12 Fiber Optic Repeaters", http://www.hirschmann.com/en/Hirschmann_Produkte/FiberINTERFACES/Feldbus_Repeater-old/OZD_Genius_G12_and_OZD_Modbus_Plus_G12_Fiber_Optic_Repeaters/index.phtml, 1 page, Accessed on Dec. 7, 2017, Belden Inc.
"Parallel Redundancy Protocol", https://en.wikipedia.org/wiki/Parallel_Redundancy_Protocol, 4 pages, Oct. 8, 2017, Wikimedia Foundation, Inc.
"PRP—Parallel redundant industrial Ethernet networks with seamless redundancy", Siemens, http://www.youtube.com/watch?v=gOumxU7Jg_l, Oct. 24, 2012, 2 pages, YouTube.
"Rapid Spanning Tree Protocol", Spanning Tree Protocol, https://en.wikipedia.org/wiki/Spanning_Tree_Protocol#Rapid_Spanning_Tree_Protocol, 13 pages, Dec. 7, 2017, Wikimedia Foundation, Inc.
"Redundant EtherNet/IP to Foundation Fieldbus H1 Linking Device", Allen-Bradley, http://ab.rockwellautomation.com/Networks-and-Communications/EtherNet-IP-to-FOUNDATION-Fieldbus, 1 page, Accessed on Dec. 8, 2017, Rockwell Automation, Inc.
"Redundant Networks for Industry", http://w3app.siemens.com/mcms/infocenter/dokumentencenter/sc/ic/Documentsu20Brochures/BR_Redundante_Netzwerke_112012_en.pdf, Simatic Net, Brochure, Nov. 2012, 12 pages, Siemens AG.
"Time-Sensitive Networking Market by Component (Switches, Hubs, Routers, and Gateways, and Memory), Application (Industrial Automation, Power and Energy, Automotive, Transportation, Oil & Gas, Aerospace), and Geography—Global Forecast to 2024 ", https://www.marketsandmarkets.com/Market-Reports/time-sensitive-networking-market-215000493.html, 2 pages, Accessed on Dec. 7, 2017, MarketsandMarkets Research Private Ltd.
"Unified Architecture", https://opcfoundation.org/about/opc-technologies/opc-ua/, 2 pages, Accessed Dec. 7, 2017, OPC Foundation.
International Search Report and Written Opinion dated May 29, 2019 in connection with PCT/US2019/021619.
AECC: "Draft 3 of ARINC project paper 664: Aircraft data network. Part 5: Network domain characteristics and interconnection", Internet Citation, Nov. 4, 2004: URL: http://web.archive.org/web/20050205154616/www.arinc.com/aeec/draft_documents/664p5_d3.pdf.

* cited by examiner

DEFEATING MAN-IN-THE-MIDDLE ATTACKS IN ONE LEG OF 1+1 REDUNDANT NETWORK PATHS

TECHNICAL FIELD

The present disclosure relates generally to computer networks, and, more particularly, to defeating man-in-the-middle attacks in one leg of 1+1 redundant network paths.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
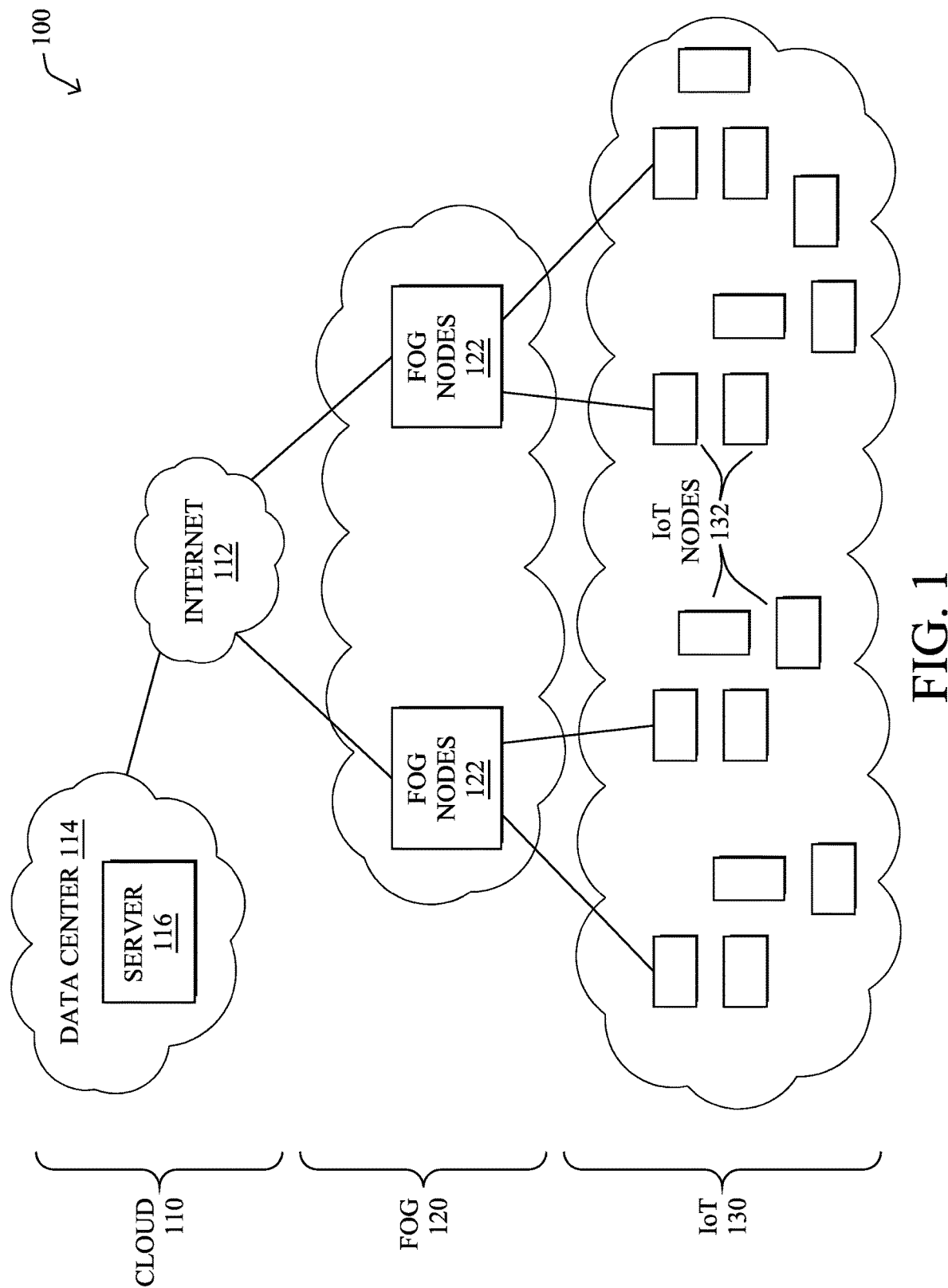
FIG. 1 illustrates an example network.

According to one or more embodiments of the disclosure, an elimination point device in a network obtains a master secret from a network controller. The elimination point device assesses, using the master secret, whether an incoming packet received by the elimination point device from a redundant path between the elimination point device and a replication point device in the network includes a valid message integrity check (MIC). The elimination point device determines whether the incoming packet was injected maliciously into the redundant path, based on the assessment of the incoming packet. The elimination point device initiates performance of a mitigation action in the network, when the elimination point device determines that the incoming packet was injected maliciously into the redundant path.

In further embodiments, a replication point device in a network obtains a master secret from a network controller. The replication point device computes a message integrity check (MIC) based on the received master secret. The replication point device encapsulates an incoming packet received by the replication point device via the network with the computed MIC and a sequence number. The replication point device provides copies of the encapsulated packet via redundant paths in the network towards an elimination point device. The elimination point device uses the computed MIC to determine whether a given packet was injected maliciously into a particular one of the redundant paths.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely the cloud 110, fog 120, and IoT device 130. Illustratively, the cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages) sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), PLC protocols, or other shared-media protocols where appropriate. In this context, a protocol consists of a set of rules defining how the nodes interact with each other.

In further embodiments network 100 may be a deterministic network or time-sensitive network (TSN). In general, deterministic networking attempts to precisely control when a data packet arrives at its destination (e.g., within a bounded timeframe). This category of networking may be used for a myriad of applications such as industrial automation, vehicle control systems, and other systems that require the precise delivery of control commands to a controlled device. However, implementing deterministic networking also places additional requirements on a network. For example, packet delivery in a deterministic network may require the network to exhibit fixed latency, zero or near-zero jitter, and high packet delivery ratios.

As an example of a deterministic network, consider a railway system. A railway system can be seen as deterministic because trains are scheduled to leave a railway station at certain times, to traverse any number stations along a track at very precise times, and to arrive at a destination station at an expected time. From the human perspective, this is also done with virtually no jitter. Which tracks are used by the different trains may also be selected so as to prevent collisions and to avoid one train from blocking the path of another train and delaying the blocked train.

Example TSN standards include, but are not limited to, Institute of Electrical and Electronics Engineers (IEEE) 802.1Qca, 802.1Qbv, 802.1Qbu/802.3br, 802.1Qch, 802.1AS-Rev, 1588 v2, 802.1Qcc, 802.1Qci, 802.1CB, and 802.1CM. Likewise, the Internet Engineering Task Force (IETF) has established a deterministic network (DetNet) working group to define a common deterministic architecture for Layer 2 and Layer 3.

Figure 2:
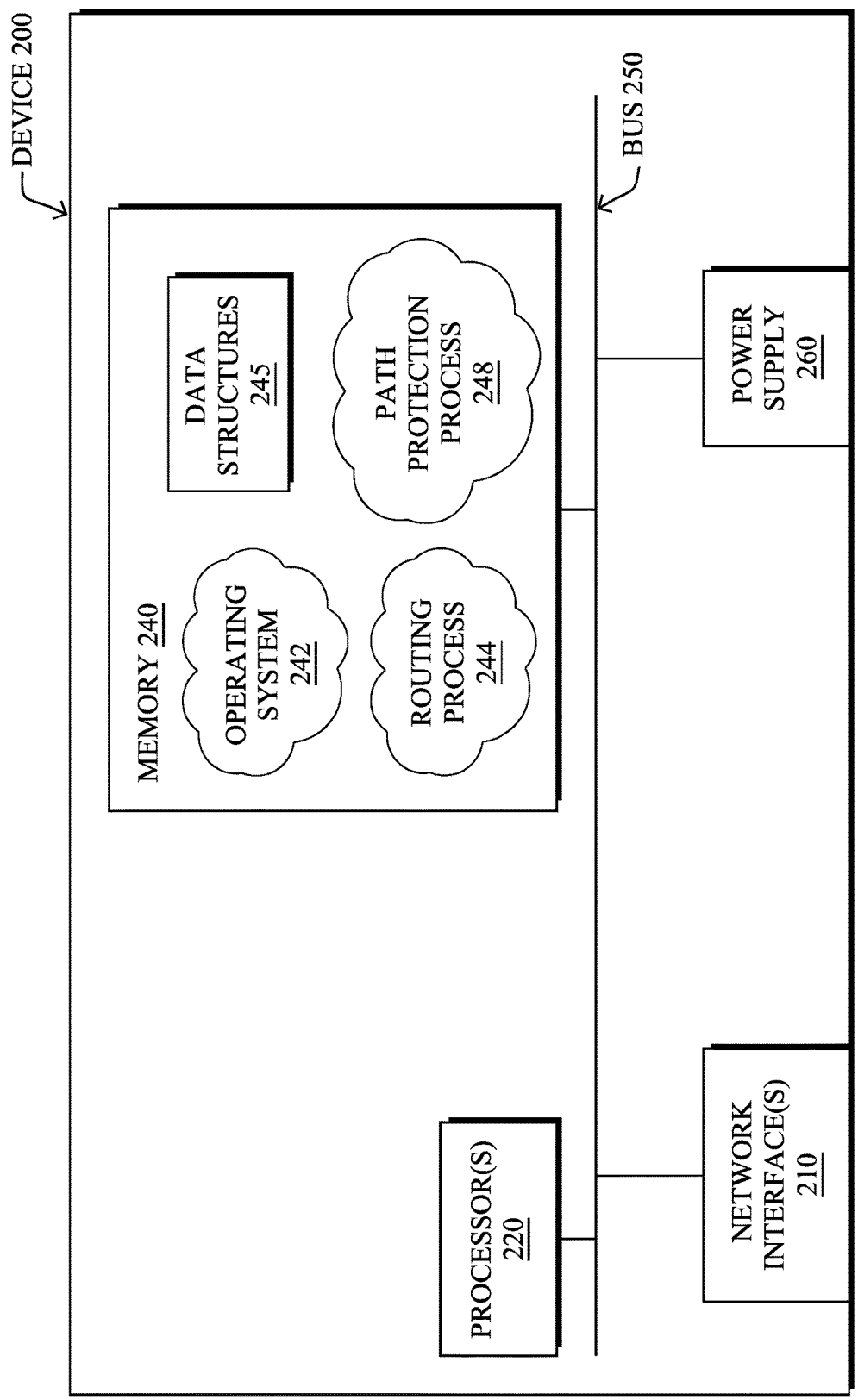
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, PLC, etc.), at least one processor 220, and a memory 240 interconnected by a system bus 250, as well as a power supply 260 (e.g., battery, plug-in, etc.).

The network interface(s) 210 include the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate the data structures 245. Operating system 242, portions of which is typically resident in memory 240 and executed by the processor, functionally organizes the device by, inter alia, invoking operations in support of software processes and/or services executing on the device. These software processes and/or services may comprise routing process/services 244 and/or an illustrative path protection process 248, as described herein. Note that while path protection process 248 is shown in centralized memory 240, alternative embodiments provide for the process to be specifically operated within the network interfaces 210, such as a component of a MAC layer (e.g., process 248a).

Routing process 244 contains computer executable instructions executed by each processor 220 to perform functions provided by one or more routing protocols, such as the Interior Gateway Protocol (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage routing and forwarding information databases (not shown) containing, e.g., data used to make routing and forwarding decisions. Notably, routing process 244 may also perform functions related to virtual routing protocols, such as maintaining VRF instances (not shown) as will be understood by those skilled in the art. In addition, routing process 244 may implement deterministic routing by scheduling the transmittal and/or delivery of packets within the network.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

As noted above, deterministic networking (DetNet), time sensitive networking (TSN), and the like, represent recent efforts to extend networking technologies to industrial settings. Indeed, industrial networking requires having predictable communications between devices. For example, consider a control loop in which a controller controls an actuator, based on a reading from a sensor. In such a case, a key requirement of the network may be the guarantee of packets being delivered within a bounded time. This translates into the following characteristics needed by the network:

High delivery ratio (loss rate of $10^{-5}$ to $10^{-9}$ depending on the application)

Fixed latency

Jitter close to zero (micro seconds)

A limited degree of control can be achieved with QoS tagging and shaping/admission control. For time sensitive flows, though, latency and jitter can only be fully controlled with the effective scheduling of every transmission at every hop. In turn, the delivery ratio can be optimized by applying 1+1 packet redundancy, such as by using High-availability Seamless Redundancy (HSR), Parallel Redundancy Protocol (PRP), or the like, with all possible forms of diversity, in space, time, frequency, code (e.g., in CDMA), hardware (links and routers), and software (implementations).

To implement 1+1 path redundancy, a talker/packet originator may be connected to a switch that acts as Replication Point (RP) device. In turn, the RP device sends duplicate copies of each packet from the talker over non-congruent paths in the network to an Elimination Point (EP) device.

The EP device forwards a copy to the listener/destination, and eliminates the second copy if two are received from the redundant network paths. The idea is that the loss of both copies is extremely rare, if the paths are fully diversified. Of course, a higher number of redundant paths is also possible, in further implementations, to further increase the chance of the EP device receiving at least one copy of the packet.

Figure 3A:
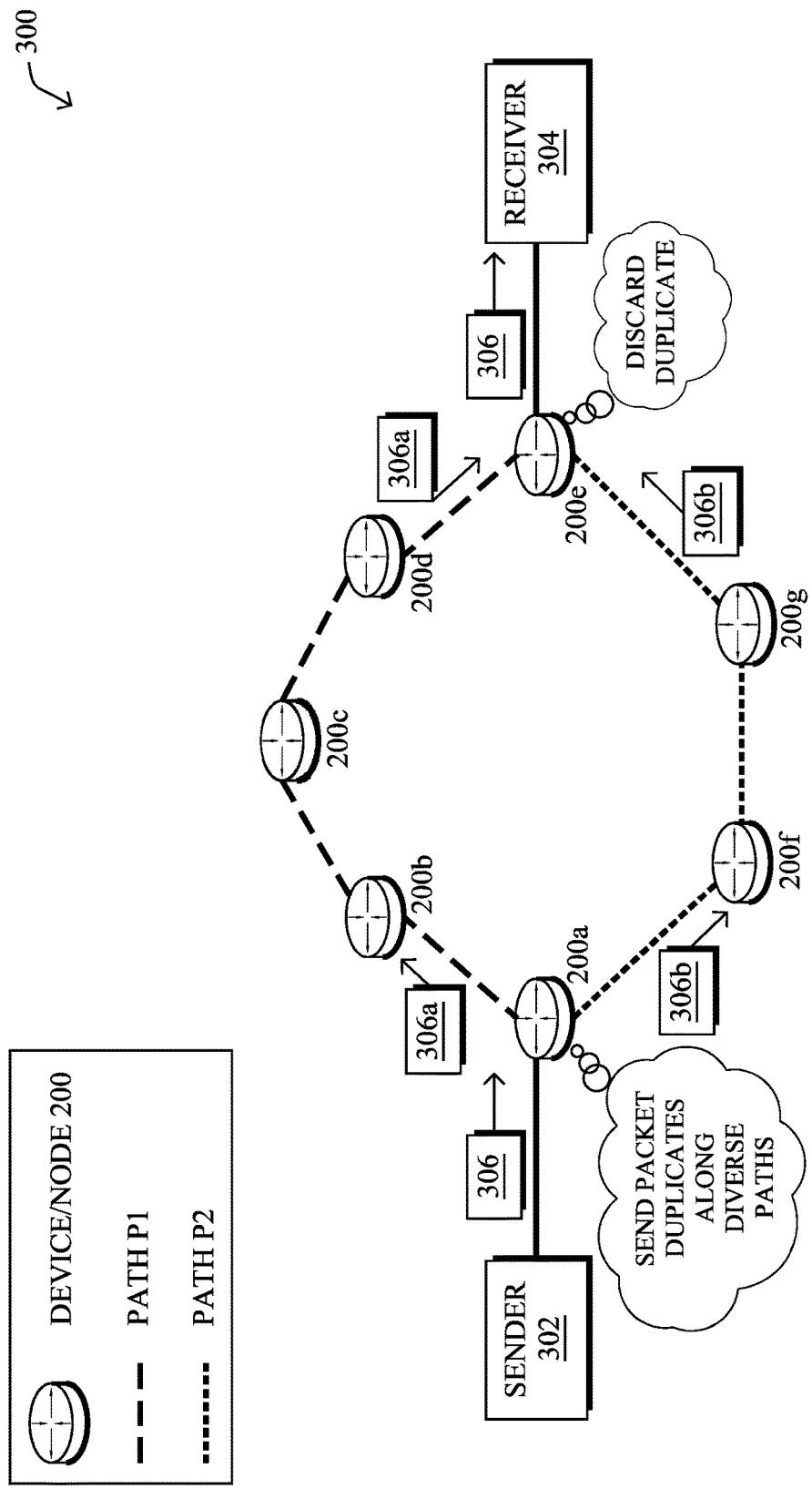
FIGS. 3A-3B illustrate an example of a compromised node injecting a packet into a network path.
Figure 3B:
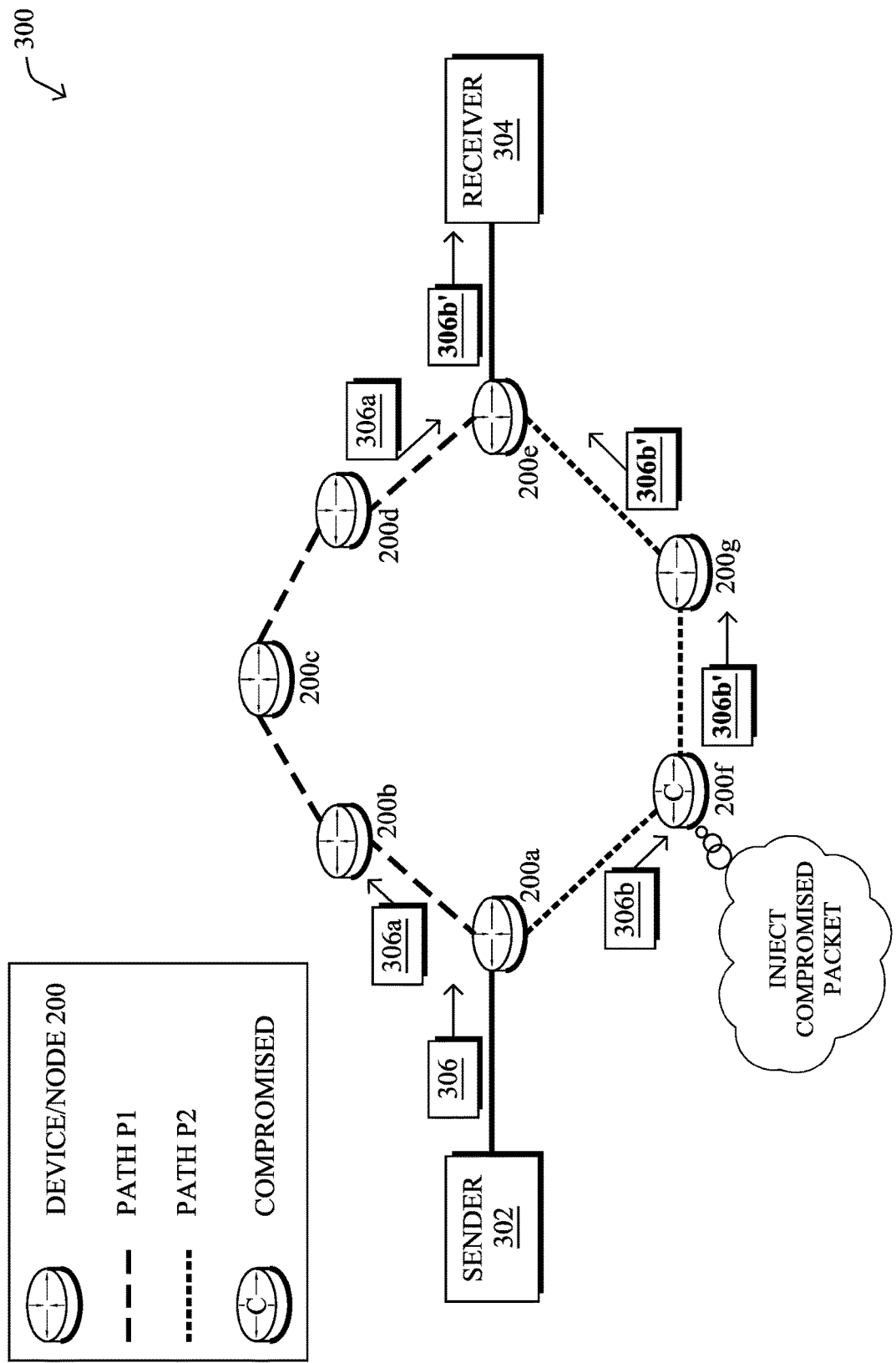

From a security standpoint, using path redundancy techniques to implement determinism in a network also increases the opportunity for a malicious entity to disrupt the operation of the network. For example, FIGS. 3A-3B illustrate an example of a compromised node injecting a packet into a network path, in various embodiments. More specifically, consider network 300 shown in FIG. 3A in which a sender 302 is to send a packet 306 to a receiver 304. For example, a sensor may send a sensor reading to a controller, a controller may send a control command to an actuator, etc. To ensure delivery of packet 306 to receiver 304 within a bounded time, devices/nodes 200 between sender 302 and receiver 304 may utilize path redundancy, such as 1+1 redundancy.

By way of example, consider the case in which sender 302 is connected to node/device 200a, such as a switch that operates as a replication point device. In response to receiving packet 306, replication point device 200a may identify redundant, diverse paths to an elimination point device 200e to which receiver 304 is connected. In turn, replication point device 200a may form copies 306a-306b of packet 306 and send them via a first path and a second path, respectively. Notably, the first path may comprise nodes 200b, 200c, 200d, and elimination point device 200e, while the second path may comprise nodes 200f, 200g, and elimination point device 200e. In other words, both paths provide diversity, as they only overlap at elimination point device 200e.

When elimination point device 200e receives either packet 306a or 306b, it may forward that copy on to receiver 304 as packet 306. Elimination point device 200e then discards any subsequent copies of packet 306, if received. For example, if elimination point device 200e first receives copy packet 306a, it may forward this copy on to receiver 304, and drop packet 306b when received. In some embodiments, sender 302 may include a sequence number in packets 306a and 306b, which elimination point device 200e may use to identify duplicates of a previously received packet (e.g., drop packet 306b if it has the same sequence number as previously-received packet 306a). The transmission over the two paths is typically arranged so that the packets arrive at elimination point device 200e within a very short difference of time. Thus, elimination point device 200e introduces a minimum amount of latency to whichever packet copy it uses.

In FIG. 3B, now assume that one of the intermediary nodes along a redundant path between devices 200a and 200e has been compromised. For example, assume that node/device 200f has been infected with malware or otherwise compromised. When compromised device 200f receives packet 306b, the copy of packet 306 sent by replication point device 200a, compromised device 200f may maliciously insert packet 306b' into the redundant path, instead of forwarding packet 306b. In turn, if elimination point device 200e received malicious packet 306b' before packet 306a, elimination point device 200e may inadvertently forward packet 306b' on to receiver 304 and eliminate packet 306a. Compromised device 200f may repeat this process any number of times, saturating the shapers at elimination point device 200e, causing it to drop more and more legitimate packets. All in all, compromised device 200f can destroy not only the traffic on its arm of the 1+1 redundant path, but also cause the traffic on the other arm to be dropped, which can utterly destroy the flow, in spite of the redundancy.

Defeating Man-in-the-Middle Attacks in One Leg of 1+1 Redundant Network Paths

The techniques herein introduce attack detection and security techniques that can be used to protect redundant paths in deterministic networks. In some aspects, packets sent via the redundant paths may be encapsulated with additional security information that the elimination point device can use to verify the legitimacy of a received packet (e.g., whether the received packet was injected maliciously into one of the redundant paths connected to the elimination point).

Specifically, according to one or more embodiments of the disclosure as described in detail below, an elimination point device in a network obtains a master secret from a network controller. The elimination point device assesses, using the master secret, whether an incoming packet received by the elimination point device from a redundant path between the elimination point device and a replication point device in the network includes a valid message integrity check (MIC). The elimination point device determines whether the incoming packet was injected maliciously into the redundant path, based on the assessment of the incoming packet. The elimination point device initiates performance of a mitigation action in the network, when the elimination point device determines that the incoming packet was injected maliciously into the redundant path.

Illustratively, the techniques described herein may be performed by hardware, software, and/or firmware, such as in accordance with the path protection process 248, which may include computer executable instructions executed by the processor 220 (or independent processor of interfaces 210) to perform functions relating to the techniques described herein, e.g., in conjunction with routing process 244.

Figure 4A:
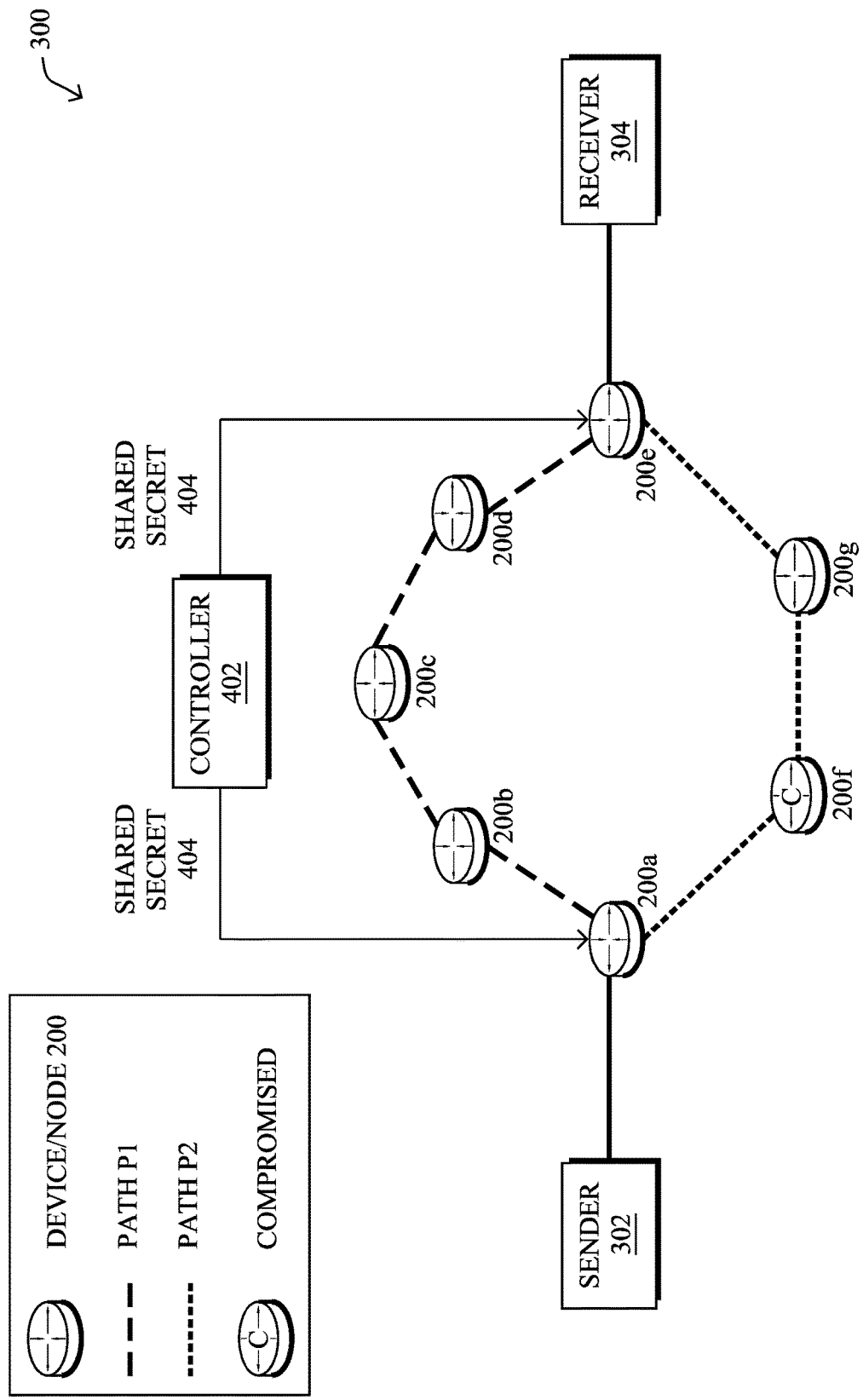
FIGS. 4A-4F illustrates an example protection mechanism for redundant network paths.
Figure 4B:
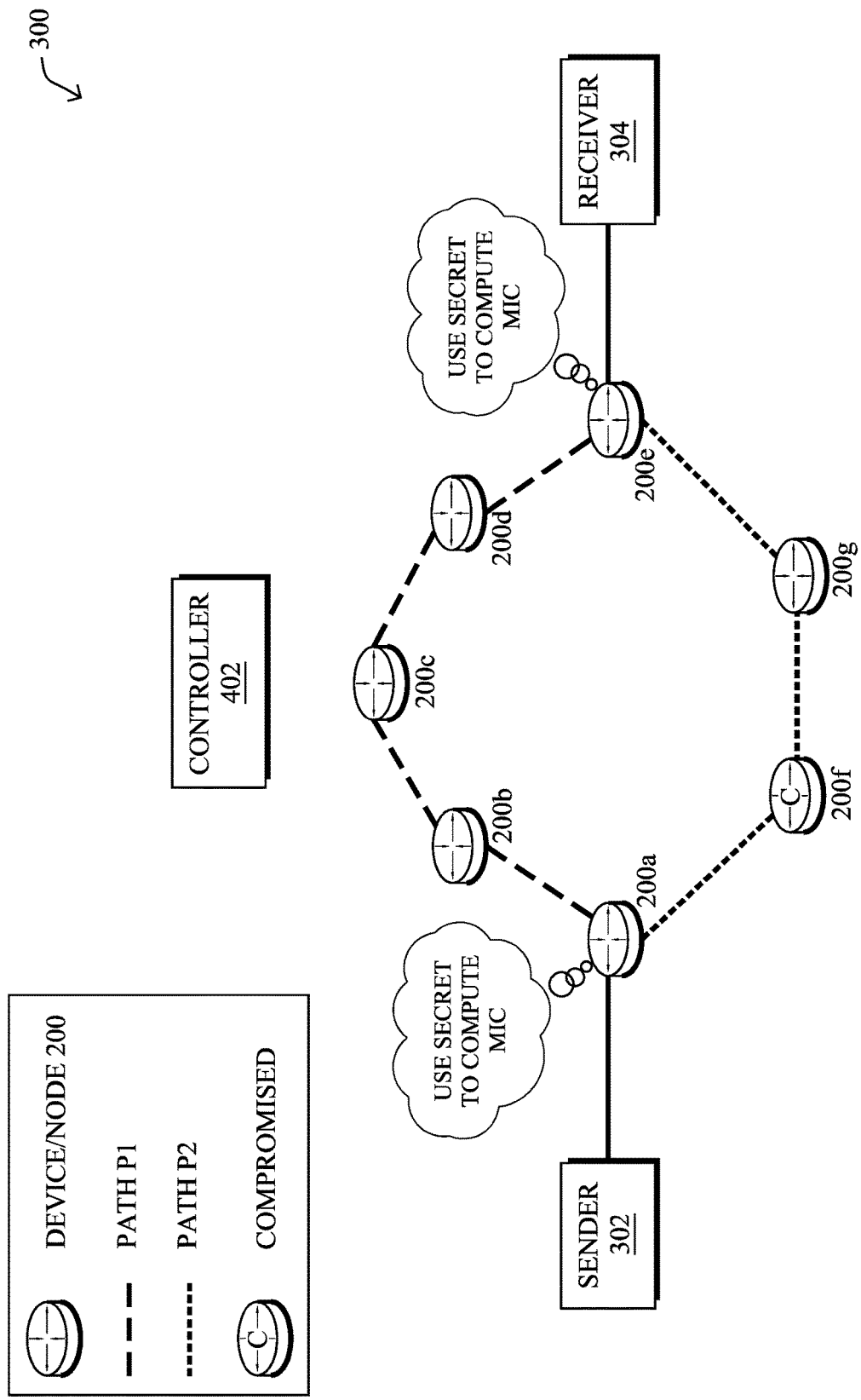

Operationally, FIGS. 4A-4F illustrates an example protection mechanism for redundant network paths, according to various embodiments. As shown in FIG. 4A, assume that nodes/devices 200 in network 300, described previously with respect to FIGS. 3A-3B, are overseen by a network controller 402. For example, network controller 402 may comprise a path computation element (PCE) that computes and installs network paths between nodes/device 200. For example, controller 402 may compute and install the redundant paths shown between nodes/devices 200a and 200e. Further examples of the functions of controller 402 may include computing communication schedules for nodes/devices 200.

In various embodiments, controller 402 may send a shared secret 404 with any replication or elimination point device, such as devices 200a and 200e shown. As a key requirement of the techniques herein, secret 404 is not shared with any of the other devices 200 (e.g., nodes 200b-200d, 200f-200g, sender 302, receiver 304, etc.). Further, in some embodiments, secret 404 may be protected from interception, such as by using encryption to send secret 404 to devices 200a and 200e.

In general, shared secret 404 may be a token with x-number of bytes that controller 402 may update periodically and/or in response to a triggering condition (e.g., a request to do so, a reported detection of a malicious packet, etc.). For example, controller 402 may update shared secret 404 at a time before a rollover of the sequence counters used by replication point device 200a to allow elimination point device 200e to drop packet duplicates. In another example, controller 402 may update shared secret 404 in response to receiving a notification from replication point device 200a that indicates that secret 404 should be renewed, as well as the current sequence counter value. In turn, controller 402 may provide a new secret to devices 200a and 200e with an indication of the sequence number at which the change should be applied.

In various embodiments, each of devices 200a and 200e may use shared secret 404 from controller 402 to compute a message integrity check (MIC) value. Note that the length of the MIC value may also differ from that of shared secret 404.

Figure 4C:
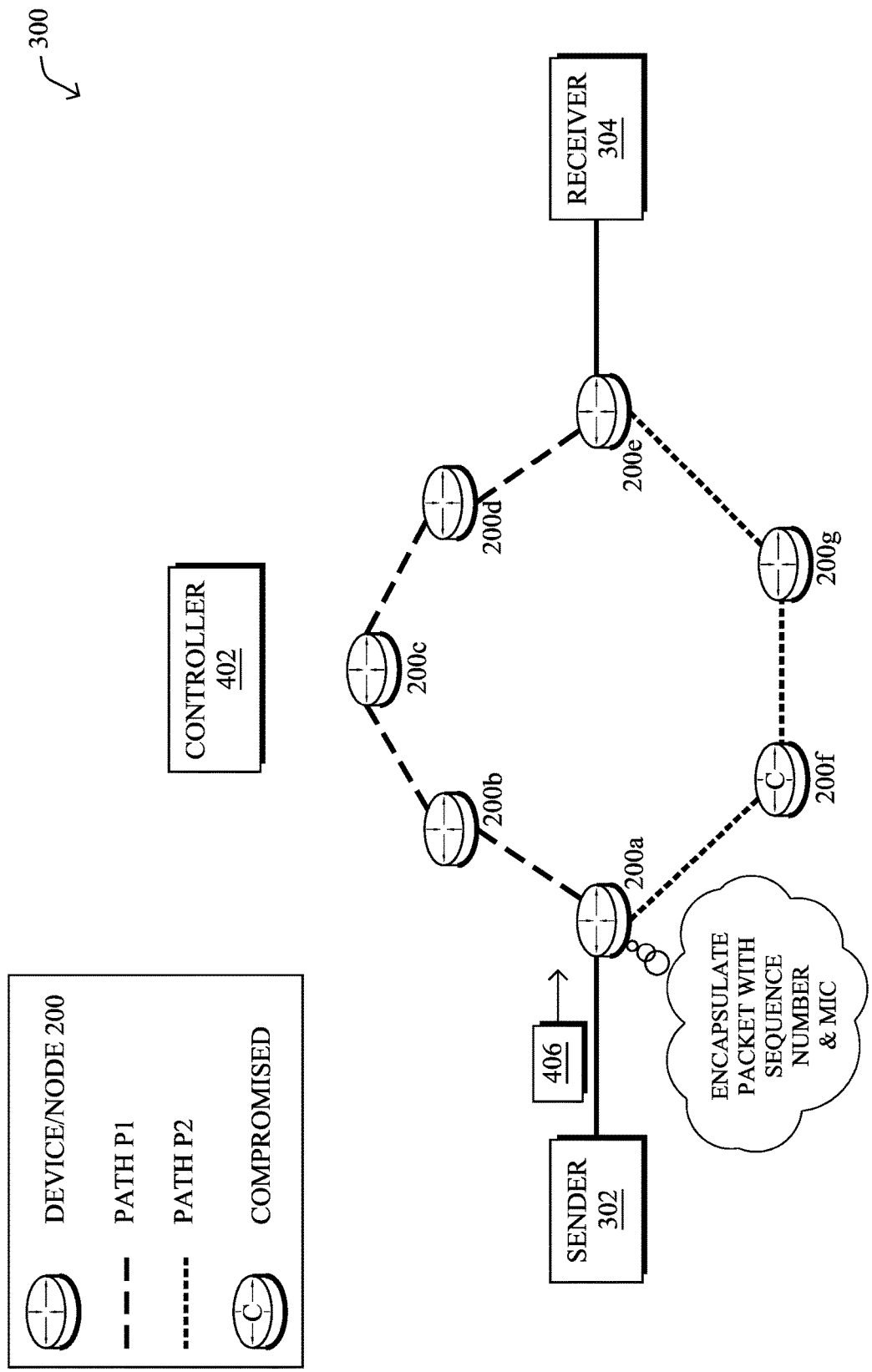

In FIG. 4C, assume that replication point device 200a receives a packet 406 from sender 302 that is destined for receiver 304. In such a case, replication point device 200a may append the computed MIC to packet 406, in various embodiments. In further embodiments, replication point device 200a may also encapsulate packet 406 with additional header information, such as the next sequence number.

Figure 4D:
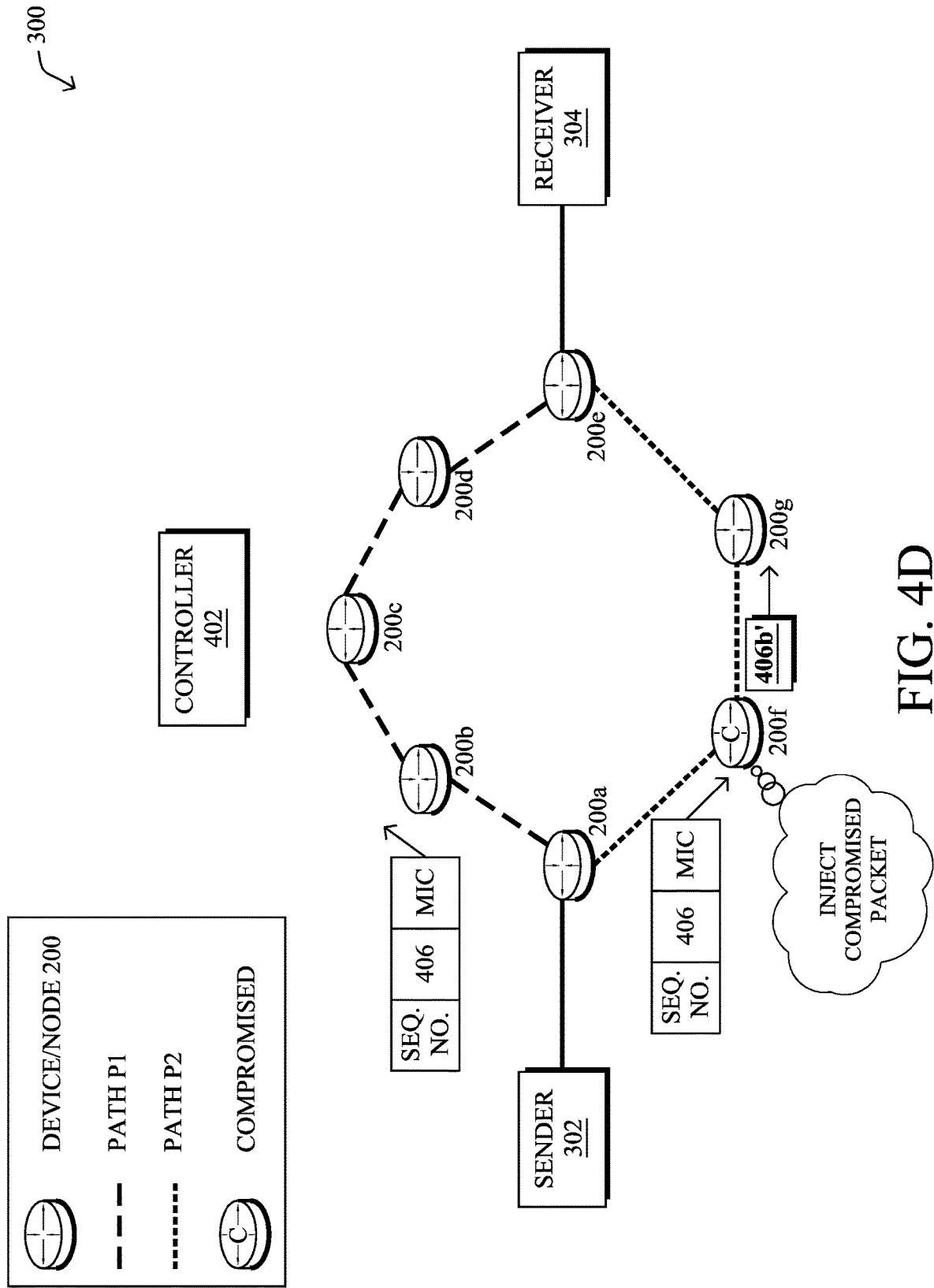
Figure 4E:
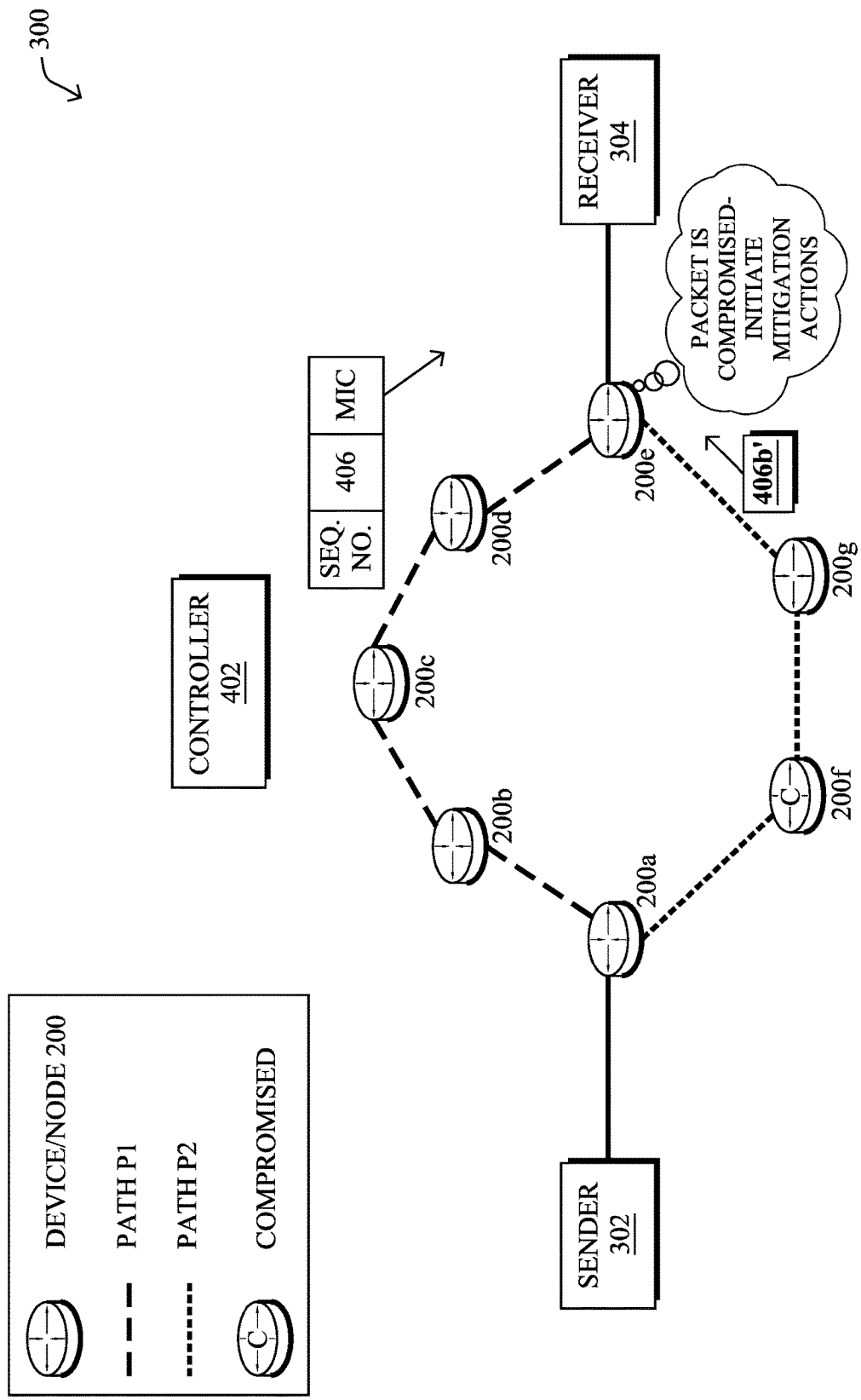

In FIG. 4D, replication point device 200a may send copies of the encapsulated packet 406, together with the computed MIC, towards elimination point device 200e via the duplicate paths shown. However, for illustrative purposes, assume that node/device 200f is still compromised and maliciously inserts packet 406b' into its path, instead of forwarding on the packet copy that it received from replication point device 200a. Note, though, that device 200f will be unable to generate packet 406b' with a valid MIC, as master secret 404 was only shared with devices 200a and 200e.

In FIG. 4D, assume that malicious packet 406b' is the first packet to reach elimination point device 200e. In this case, elimination point device 200e may look, not only at the sequence number of an incoming packet, but also at the MIC of an incoming packet. Such an analysis can be as simple as performing a cyclic redundancy check (CRC). For example, the MIC token can be a simple CRC of shared secret+frame, the key being that only the frame is transported, wrapped into a 1+1 encapsulation that also has a 1+1 sequence counter, as described in 802.1CB and PRP. Since packet 406b' lacks the MIC computed by replication point device 200a, and similarly computed by elimination point device 200e, elimination point device 200e may determine that a node along the path from which it received packet 406b' has injected packet 406b' into the path, maliciously.

In response to determining that a received packet was injected maliciously into a redundant network path, elimination point device 200e may initiate the performance of any number of mitigation actions. For example, elimination point device 200e may prevent packet 406b' from being forwarded on to receiver 304, either by dropping packet 406b' entirely, rerouting packet 406b' to a security device in the network, or by storing packet 406b' for further assessment.

Additional mitigation actions are also possible, in further embodiments. For example, if elimination point device 200e detects that a redundant path has been compromised (e.g., by detection of one or more maliciously injected packets), it may send a signal back to controller 402 while listing the set of visited nodes. Note that if controller 402 acts as a stateful PCE in the network to establish the tunnel(s) between devices 200a and 200e, this may be sufficient for controller 402 to obtain the set of visited nodes. Otherwise, if device 200e can identify the compromised node, it may include this in the notification to controller 402. In the case of controller 402 comprising a PCE, such a notification can be sent using PCE Protocol (PCEP) extensions.

In response to being notified by elimination point device 200e of a maliciously injected packet into one of the redundant paths, controller 402 may compute a new set of diverse paths between devices 200a and 200e, so as to avoid any potentially compromised nodes/devices. For example, if device 200e received a maliciously injected packet from the path that includes devices 200f-200g, controller 402 may compute and install another path between devices 200a and 200e that avoids both of these intermediates (or just 200f, if it can be identified as the compromised node). In some embodiments, controller 402 may decide to temporarily quarantine the node that seems to be compromised until further investigations. Alternatively, after the expiration of a timer based on the received notification, controller 402 may begin using the suspected node again within a computed redundant path between devices 200a and 200e. Controller 402 may also stop using the node if the node gets compromised again, potentially with some exponential backoff, to avoid quarantining and un-quarantining a node too frequently.

Figure 4F:
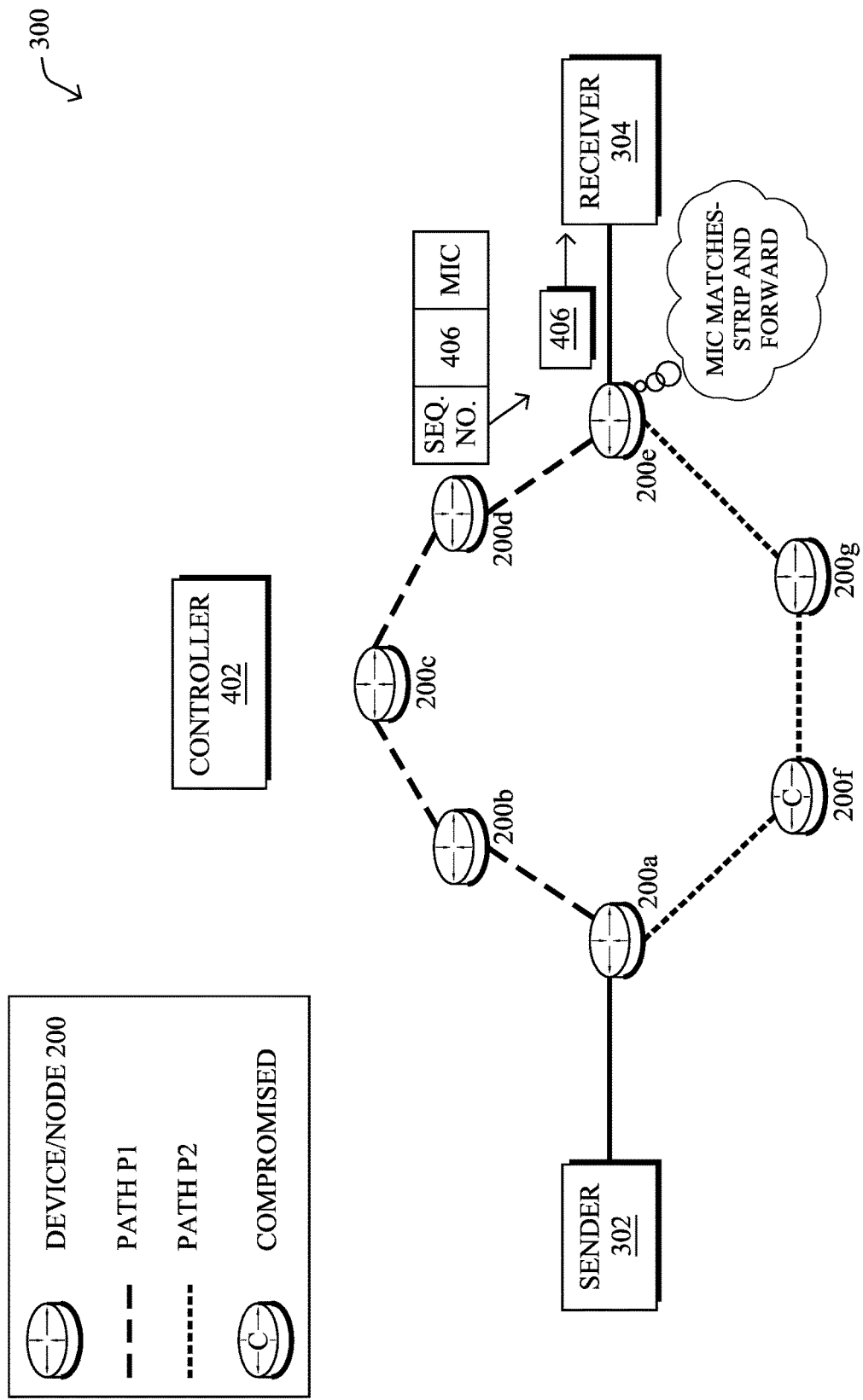

As shown in FIG. 4F, when elimination point device 200e receives a copy of the encapsulated packet 406 from node/device 200d, the received packet is still eligible for forwarding on to receiver 304, even though device 200e first received the malicious packet 406b'. In turn, elimination point device 200e may ensure that the copy of the encapsulated packet 406 includes the correct information (e.g., sequence number and/or MIC) and, if so, decapsulate packet 406 and forward it on to receiver 304. Similarly, elimination point device 200e may also perform an anti-replay check by ensuring that the sequence number in the received packet is correct, before forwarding packet 406 on to receiver 304.

Figure 5:
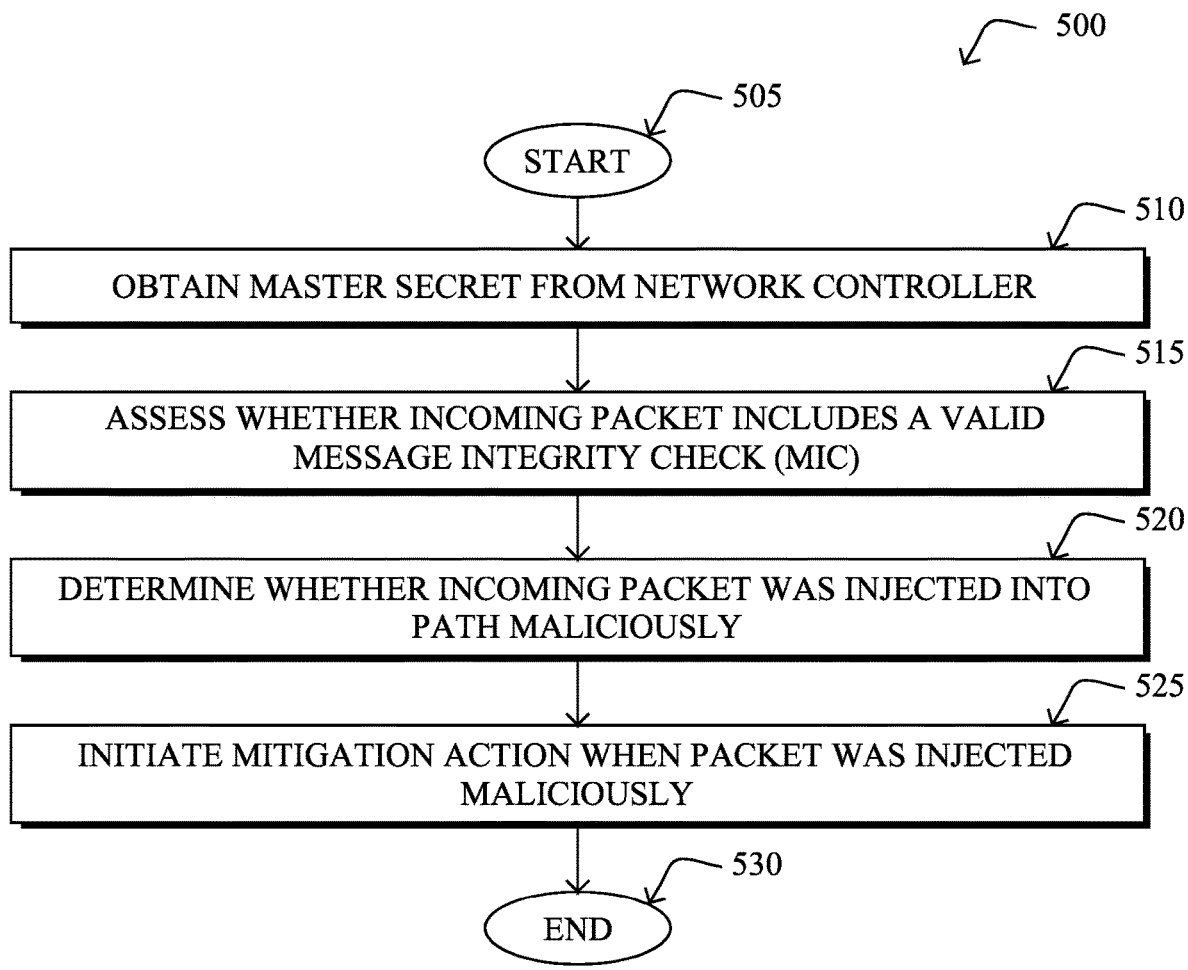
FIG. 5 illustrates an example simplified procedure for detecting a packet that was maliciously injected into a redundant network path.

FIG. 5 illustrates an example simplified procedure for detecting a packet that was maliciously injected into a redundant network path, in accordance with one or more embodiments described herein. For example, a non-generic, specifically configured device (e.g., device 200) may perform procedure 500 by executing stored instructions (e.g., process 248), such as an elimination point device in a network. The procedure 500 may start at step 505, and continues to step 510, where, as described in greater detail above, the elimination point device may obtain a master secret from a network controller. In various embodiments, the controller may comprise a PCE, such as a PCE that computes and installs redundant paths in a deterministic or time-sensitive network.

At step 515, as detailed above, the elimination point device may assess, using the received master secret, whether an incoming packet received by the elimination point device from a redundant path between the elimination point device and a replication point device in the network includes a valid message integrity check (MIC). For example, the MIC token can be a simple CRC of shared secret+frame, which the elimination point device can use to verify that the MIC of the incoming packet was computed using the same master secret received by the elimination point device from the controller. Of course, if the packet lacks such an MIC, the elimination point device may similarly determine that the packet does not include a valid MIC.

At step 520, the elimination point device may determine whether the incoming packet was injected maliciously into the redundant path, based on the assessment of the incoming packet, as described in greater detail above. Notably, if the packet does not include a valid MIC, this is an indication that the packet was inserted into the redundant path, maliciously.

At step 525, as detailed above, the elimination point device may initiate performance of a mitigation action in the network, when the elimination point device determines that the incoming packet was injected maliciously into the redundant path. In some embodiments, the mitigation action may entail dropping, redirecting, or otherwise preventing forwarding of the packet deemed malicious on towards its destination. In addition, the malicious packet will not be treated as having a valid sequence number for purposes of eliminating redundant packets sent via different paths in the network. In other words, even if elimination point device receives the malicious packet first, it may nonetheless forward on a legitimate copy of the packet that it may receive later in time. Other mitigation actions may include notifying the network controller, which can then install different redundant paths. Procedure 500 then ends at step 530.

Figure 6:
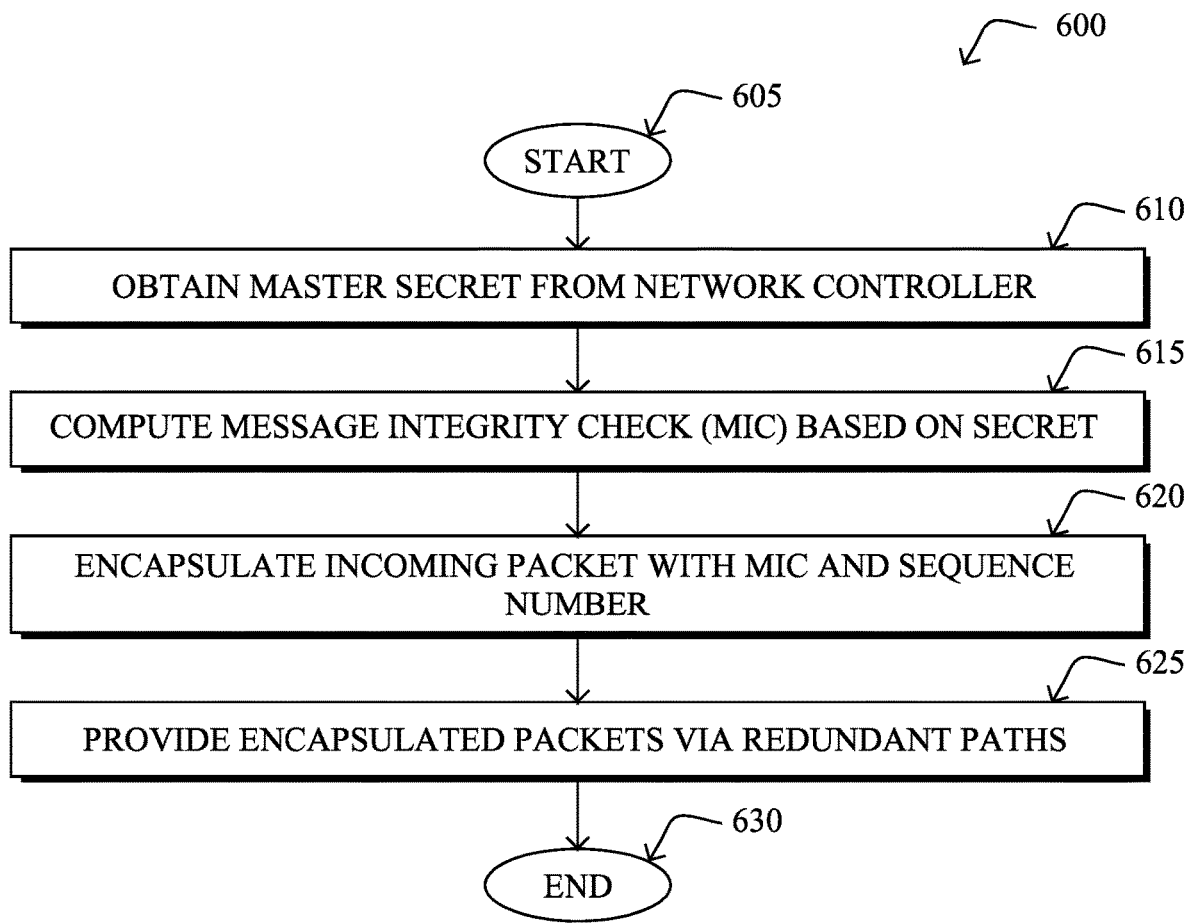
FIG. 6 illustrates an example simplified procedure for sending a packet via redundant network paths.

FIG. 6 illustrates an example simplified procedure for sending a packet via redundant network paths, in accordance with one or more embodiments described herein. For example, a non-generic, specifically configured device (e.g., device 200) may perform procedure 600 by executing stored instructions (e.g., process 248), such as a replication point device in a network. The procedure 600 may start at step 605, and continues to step 610, where, as described in greater detail above, the replication point device may obtain a master secret from a network controller. In various embodiments, the controller may comprise a PCE, such as a PCE that computes and installs redundant paths in a deterministic or time-sensitive network.

At step 615, as detailed above, the replication point device may compute a message integrity check (MIC) based on the received master secret. For example, in one embodiment, the MIC token can be a simple CRC of the master secret plus the frame to be sent by the replication point device.

At step 620, the replication point device may encapsulate an incoming packet received by the replication point device via the network with the computed MIC and a sequence number, as described in greater detail above. Generally, the sequence number may be used by a corresponding elimination point device in the network to identify copies of a packet sent by the replication point device (e.g., the duplicate copies may share the same sequence number).

At step 625, as detailed above, the replication point device may provide copies of the encapsulated packet via redundant paths in the network towards the elimination point device. The elimination point device uses the computed MIC to determine whether a given packet was injected maliciously into a particular one of the redundant paths. Notably, when the master secret is shared with only the replication and elimination point devices, any intermediate devices will not be able to add a valid MIC to a packet. Thus, if the elimination point device determines that an incoming packet lacks a valid MIC, this determination is a strong indicator that the packet was sent maliciously. Procedure 600 then ends at step 630.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, use a shared secret in endpoints of redundant network paths which can be used together with the packet in the CRC computation (as a MIC computation) to protect the redundant communications from man-in-the-middle attacks. This can also be done at low cost and low latency, making it particularly suited for deterministic and time-sensitive networks. In addition, the techniques herein do not require more complicated encryption schemes, such as public key cryptography. Further, the secret used herein can be simple, such as the root of a soft token, meaning that all a node needs to compute the next and include that in the packet before CRC. Since the packets are sequenced, missing one is also not a problem, which is a lot less greedy in terms of resources than a hashed message authentication code (HMAC) and can be done without slowing down the packet, from a networking standpoint. Additionally, the techniques herein can use a controller to push and renew the shared secret, whereby there is a trust model in place between the nodes and their controller(s). The controller knows the throughput and frame size, so can it can infer how soon it needs to refresh the shared secret before the sequence number of the redundancy wraps. In turn, the controller can provide the new secret in advance and also note at which sequence number the nodes are to start using the new secret.

While there have been shown and described illustrative embodiments that provide for defeating man-in-the-middle attacks in one leg of 1+1 redundant network paths, it is to be understood that various other adaptations and modifications may be made within the spirit and scope of the embodiments herein. For example, while certain embodiments are described herein with respect to using 1+1 redundancy, the techniques herein can also be applied to any other form of redundancy that uses more than two diverse paths.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:

obtaining, at an elimination point device in a network, a master secret from a network controller;

assessing, by the elimination point device and using the master secret, whether an incoming packet received by the elimination point device from a redundant path between the elimination point device and a replication point device in the network includes a valid message integrity check (MIC), wherein the incoming packet is a 1+1 packet redundancy;

determining, by the elimination point device, whether the incoming packet was injected maliciously into the redundant path, based on the assessment of the incoming packet; and initiating, by the elimination point device, performance of a mitigation action in the network, when the elimination point device determines that the incoming packet was injected maliciously into the redundant path.

2. The method as in claim 1, wherein the network is a deterministic or time-sensitive network.

3. The method as in claim 1, wherein the network controller comprises a path computation element (PCE) that computes redundant paths in the network, and wherein initiating performance of the mitigation action comprises:
providing a notification to the PCE regarding the packet injected maliciously into the redundant path via a PCE Communication Protocol (PCEP) message.

4. The method as in claim 3, wherein the PCE excludes one or more nodes along the redundant path from inclusion in further path computations for a period of time after obtaining the notification.

5. The method as in claim 1, further comprising:
determining, by the elimination point device, that a second incoming packet received by the elimination point device comprises the valid MIC; and
forwarding, by the elimination point device, the second incoming packet via the network, based on the second incoming packet comprising the valid MIC.

6. The method as in claim 1, wherein initiating performance of the mitigation action comprises:
dropping, by the elimination point device, packets received from the replication point device via the redundant path.

7. The method as in claim 1, further comprising:
using, by the elimination point device, a sequence number of a received packet to determine whether the received packet is a duplicate of a packet previously received by the elimination point device.

8. The method as in claim 1, wherein one or more nodes along a redundant path between the replication point device and the elimination point device do not have access to the master secret.

9. A method comprising:
obtaining, at a replication point device in a network, a master secret from a network controller;
computing, by the replication point device, a message integrity check (MIC) based on the master secret;
encapsulating, by the replication point device, an incoming packet received by the replication point device via the network with the computed MIC and a sequence number; and
providing, by the replication point device, copies of the encapsulated packet via redundant paths in the network towards an elimination point device, wherein the copies are 1+1 packet redundancies and the elimination point device uses the computed MIC to determine whether a given packet was injected maliciously into a particular one of the redundant paths.

10. The method as in claim 9, wherein the network is a deterministic or time-sensitive network.

11. The method as in claim 9, wherein the network controller comprises a path computation element (PCE) that computes the redundant paths in the network.

12. The method as in claim 11, further comprising:
obtaining, at the replication point device, a new redundant path computed by the PCE to replace the particular redundant path, in response to the elimination point device notifying the network controller of a packet injected maliciously into the particular redundant path.

13. An apparatus, comprising:
one or more network interfaces to communicate with a network;
a processor coupled to the one or more network interfaces and configured to execute one or more processes; and
a memory configured to store a process executable by the processor, the process when executed configured to:
obtain a master secret from a network controller;
assess, using the master secret, whether an incoming packet received by the apparatus from a redundant path between the apparatus and a replication point device in the network includes a valid message integrity check (MIC), wherein the incoming packet is a 1+1 packet redundancy;
determine whether the incoming packet was injected maliciously into the redundant path, based on the assessment of the incoming packet; and
initiate performance of a mitigation action in the network, when the apparatus determines that the incoming packet was injected maliciously into the redundant path.

14. The apparatus as in claim 13, wherein the network is a deterministic or time-sensitive network.

15. The apparatus as in claim 13, wherein the network controller comprises a path computation element (PCE) that computes redundant paths in the network, and wherein the apparatus initiates performance of the mitigation action by:
providing a notification to the PCE regarding the packet injected maliciously into the redundant path via a PCE Communication Protocol (PCEP) message.

16. The apparatus as in claim 15, wherein the PCE excludes one or more nodes along the redundant path from inclusion in further path computations for a period of time after receiving the notification.

17. The apparatus as in claim 13, wherein the process when executed is further configured to:
determine that a second incoming packet received by the apparatus comprises the valid MIC; and
forward the second incoming packet via the network, based on the second incoming packet comprising the valid MIC.

18. The apparatus as in claim 13, wherein the apparatus initiates performance of the mitigation action by:
dropping packets received from the replication point device via the redundant path.

19. The apparatus as in claim 13, wherein the process when executed is further configured to:
use a sequence number of a received packet to determine whether the received packet is a duplicate of a packet previously received by the apparatus.

20. The apparatus as in claim 13, wherein one or more nodes along a redundant path between the replication point device and the apparatus do not have access to the master secret.

* * * * *